Patented Apr. 26, 1949

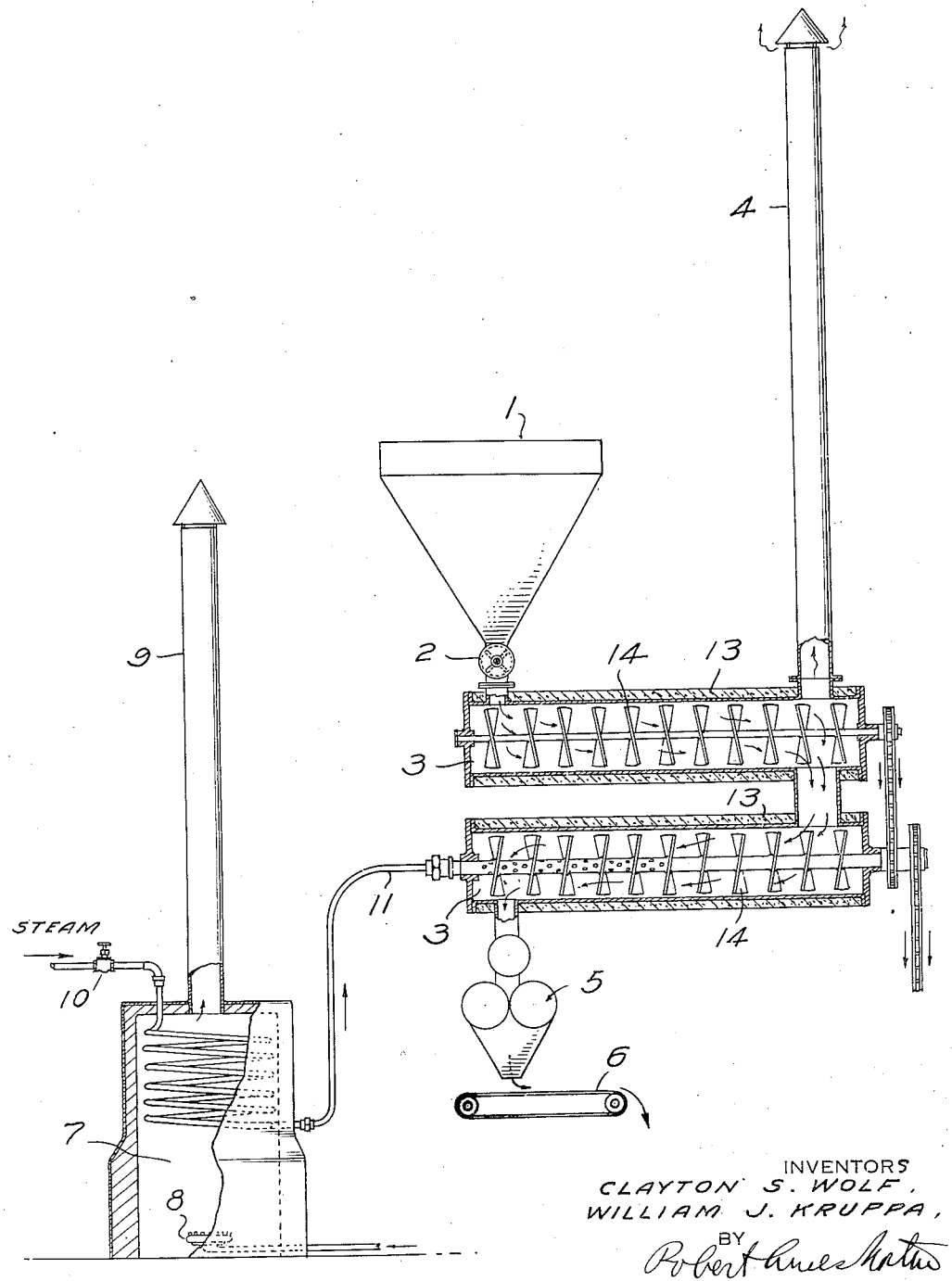

2,468,610

UNITED STATES PATENT OFFICE 2,468,610

DUSTLESS PLASTIFICATION OF ULTRAMARINE RAW MIX

Clayton S. Wolf, Salt Lake City, Utah, and William J. Kruppa, Somerville, N. J., assignors to American Cyanamid Company, New York, N. Y., a corporation of Maine Application April 3, 1946, Serial No. 659,344

3 Claims. (Cl. 106—305)

This invention relates to an improved method of briquetting raw mix for the production of ultramarine.

A recent improvement in the production of ultramarine involves the briquetting of ultramarine raw mix into briquets of uniform size and consistency and firing the mix in briquet form. This improved process is described and claimed in the copending application of Beardsley and Whiting, Serial No. 606,886, filed July 24, 1945 and now matured into Patent No. 2,441,950. In order to produce briquets of satisfactory mechanical strength some binder is required if a roll press is used. The ultramarine raw mix usually contains two components which melt at fairly low temperatures, namely, the sulfur which melts at about 120° C., and rosin or pitch, which melt at a temperature slightly lower. The molten sulfur and rosin act as a binder and briquets of satisfactory mechanical strength may be obtained if the raw mix in the briquetting process is heated up to a temperature causing the sulfur and rosin to melt. Certain ultramarine mixes contain charcoal as a reducing agent instead of rosin or pitch. In these mixes, of course, the melted sulfur is the only binding agent.

The heating of a loose powdery mix from which the briquets are made presents serious difficulty. If hot briquet presses are used or if the mass is preheated by heating the walls of the containing vessel, the results are not satisfactory unless excessively slow heating is used, because the penetration of heat is so low due to the insulating effect of the air spaces in the powder. Any attempt to heat rapidly results in severe overheating in contact with the walls, and if stirring is employed the material cakes on the walls and on the arms or blades of the stirrer. This cake still further reduces the heat transfer. The caking which results from any attempts at rapid heating also interferes seriously with the discharge of the heated material into the briquet press.

It might be assumed that the problem of rapid heating of the raw mix could be solved by using a heated gas passing through the mix as the heating agent. When this is attempted rapid heating results but the very finely ground ultramarine mix causes a very serious dust problem, as large quantities are carried along by the stream of gas until the mass reaches a temperature at which the binders melt. Not only does the dusting require dust collectors, which adds to the expense of any plant, but the composition of the mix changes because the composition of the dust collected is not the same as the original mix. Internal gas heating, therefore, is not practical.

The present invention solves the problem. According to the present invention superheated steam is used as the heating gas. This permits a rapid heating with relatively small steam flow. Also, the initial effect is to condense some of the steam in the form of water, which prevents dusting. It is true that the condensed water is eventually evaporated by the steam and in a batch process there is a slight possibility of dusting between the temperature of 100° C., at which the condensed water evaporates, and the melting of the constituents, which begins at 115° C. However, this interval is so short and the heat capacity of steam is so high that the amount of dusting which results in the extremely short time during which the initial wet material is at a temperature between 100 and 115° C. is small enough so that it does not render the operation impractical.

The use of superheated steam eliminates dusting to a very large extent in any method, whether batch or continuous. It is possible to eliminate dusting completely in a continuous process, which constitutes the preferred embodiment of the present invention, although the invention is not broadly limited to the details thereof. In this continuous process the ultramarine raw mix is slowly moved through an elongated chamber, for example, by a screw, and superheated steam is introduced countercurrent to the flow of mix. The cold mix as it enters encounters steam which has lost substantially all of its superheat. Condensation therefore takes place, which performs two functions. First, the mix is dampened and therefore does not dust. Secondly, to the extent to which the steam condenses a very rapid preheating results because of the great latent heat of vaporization of water. The damp mix then moves along encountering steam having more and more super heat. This results in a gradual evaporation of the water and in finally raising the mix to a temperature high enough to melt the sulfur and rosin. The zone where the mix is at a temperature between 100 and 115° C. and at which point it might dust is located in the middle of a closed chamber. Therefore no dusting results, because if any dust is formed it is scrubbed out by the damp mix through which it passes. The net result is that the steam discharged from the end of the conveyor contains only the merest traces of solid particles.

It will be noted that the weight of steam leaving the vessel is the same as that fed in. It is only the superheat which has been used, although some of the steam condenses in the cold end, preventing dust, and resulting in very rapid preheating. This steam is re-evaporated by the superheat in the hotter zones. Accordingly, the higher the superheat the smaller the weight of steam required. The high superheat results not only in economy of steam but it reduces the mass velocity of the flow through the system. High superheat is, therefore, desirable, and we prefer to use superheat of from 400 to 500° C. This is high enough to give good economy and not so high as to impose serious material limitations on the apparatus. At a temperature of 450° C. we have found that it takes approximately 400 lbs. of steam per ton of briquets.

The invention will be described in greater detail in conjunction with the drawing, which is a vertical elevation partly in section through an apparatus in which the present process may be performed.

Suitably blended and ground raw mix which may, for example, be in the proportion of 30.5 parts china clay, 5.3 parts diatomaceous earth, 27.8 parts soda ash, 33 parts of sulfur and 3.3 parts of rosin, is filled into a hopper 1. From the hopper mix is fed by the motor driven feeder 2 at slow speed into two cylindrical vessels 3 connected in series and provided with insulation 13 and conveyor screws 14 provided with suitable paddles which effect mixing as well as conveying.

Saturated steam is fed into a superheater 7 through a control valve 10 and superheat is produced by the gas burner 8, the combustion gases passing off through a stack 9. The superheated steam passes through a pipe 11 into the mixers 3, the pipe being provided with perforations inside the lower mixer to effect a more uniform dispersion of the superheated steam. The steam passes along the lower heater and out through the stack 4. In the upper heater it encounters cold ultramarine mix and some condensation takes place. As the mix moves forward in the lower mixer 3 it encounters steam of progressively higher superheat, the condensed steam in the mixture is evaporated and the mix is brought up to a temperature of 120° C. or over, at which temperature the sulfur and rosin melt and a hot, dry, non-dusting, self-adhesive mix is discharged into a conventional revolving briquet press 5, the briquets being discharged onto a suitable conveyor 6.

It will be noted that the raw mix from the hopper does not discharge into a portion of the mixing chambers where steam is flowing. This sacrifices a certain amount of space of the mixing chamber but it is desirable because the condensation of saturated steam on the cold mix renders the latter sufficiently sticky so that difficulty is encountered with feeder 2 due to sticking if steam is allowed to rise into it. For this reason the mix is discharged into a dry portion of the mixing chamber and is fed by the paddle conveyors to the point where it encounters the saturated steam.

The quantity of superheated steam required depends on its temperature and on the rate of production of hot briquet mix. With a temperature of 450° C. the flow of steam will be about 400 lbs. for each 2,000 lbs. of dry briquets.

We claim:

1. A method of heating cold, dry, highly particulate and dusty ultramarine raw mix without substantial evolution of dust, and thereby producing a hot, relatively dry, non-dusting ultramarine raw mix suitable for briquetting, which comprises: admitting a stream of highly superheated steam into said cold raw mix; controlling the temperature and flow of steam so that at least a portion of said steam condenses to form a wet zone in the ultamarine mix nearest the steam exit, whereby the dusting of said mix is prevented; and continuing the admission of said superheated steam until substantially all the water in said wet zone has evaporated and at least one of the components of said mix has melted to an extent sufficient to act as a briquet binder and dust inhibitor.

2. A continuous method of heating cold, dry, highly particulate ultramarine raw mix without substantial evolution of dust and thereby continuously producing a hot, relatively dry, non-dusting ultramarine raw mix suitable for briquetting, which comprises: continuously moving a stream of ultramarine raw mix countercurrent to a stream of highly superheated steam and in direct contact therewith; controlling the temperature and flow of said steam so that at least a portion thereof condenses to form a wet zone in said ultramarine raw mix nearest the steam exit, whereby the dusting of said mix is prevented; and continuously moving said wet zone countercurrent to the flow of said steam into hotter zones and thereby evaporating said condensed steam from said wet zone and melting at least one of the components of said mix to an extent sufficient to act as briquet binder and dust inhibitor.

3. The method according to claim 2 in which the temperature of the highly superheated steam is between about 400° and 500° C.

CLAYTON S. WOLF.
WILLIAM J. KRUPPA.

REFERENCES CITED

The following references are of record in the file of this patent:

UNITED STATES PATENTS

| Number | Name | Date |
|---|---|---|
| 567,509 | Reitz | Sept. 8, 1896 |
| 705,787 | Pratt | July 29, 1902 |
| 1,339,771 | Lowden | May 1, 1920 |
| 1,371,546 | Bollmann | Mar. 15, 1921 |
| 1,416,960 | Ladisch | May 23, 1922 |
| 1,420,679 | Beckworth | June 27, 1922 |
| 2,360,257 | Muller | Oct. 10, 1944 |
| 2,374,425 | Weerth | Apr. 24, 1945 |

FOREIGN PATENTS

| Number | Country | Date |
|---|---|---|
| 4,980 | Great Britain | May 1, 1916 |
| 44,483 | Netherlands | Oct. 16, 1938 |

OTHER REFERENCES

Briquetting, Stillman, page 287.